L. HOLCOMB.
ELECTRICALLY HEATED SOLDERING TOOL.
APPLICATION FILED MAY 2, 1917.
1,238,671. Patented Aug. 28, 1917.
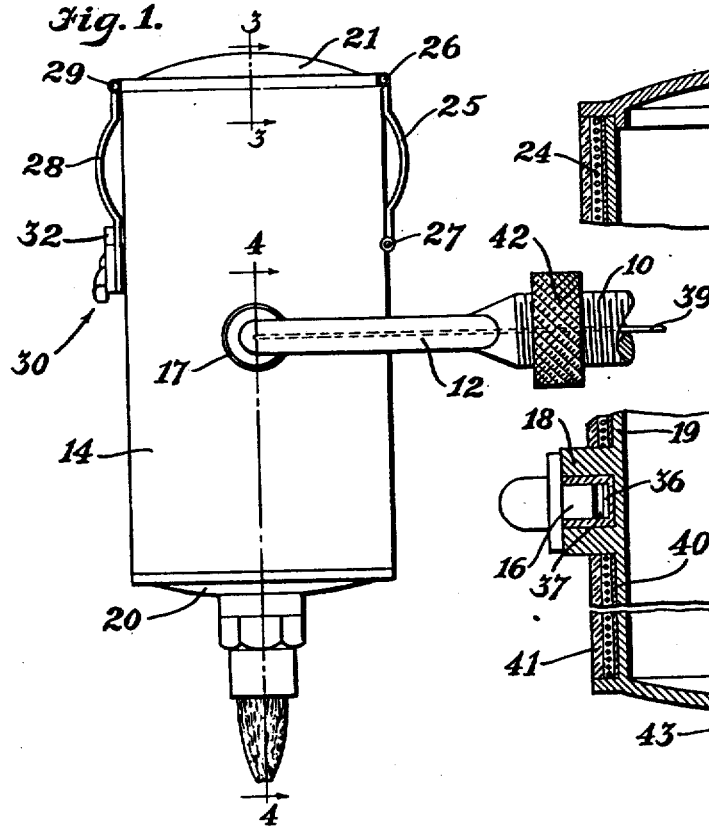
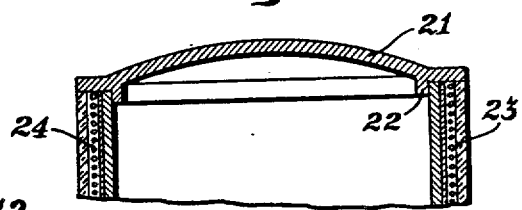
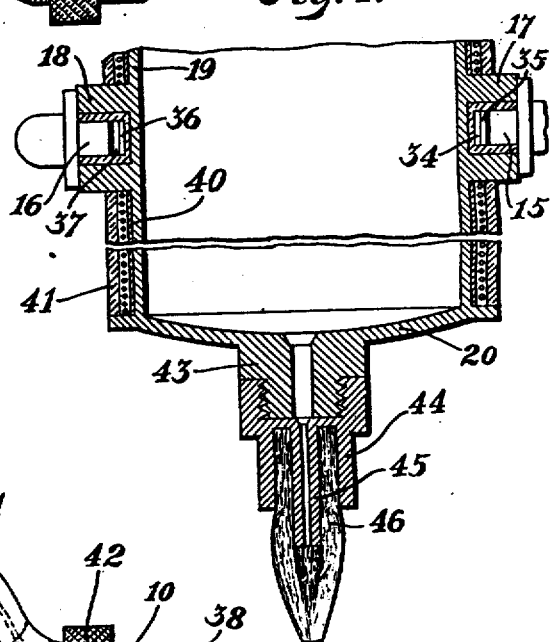
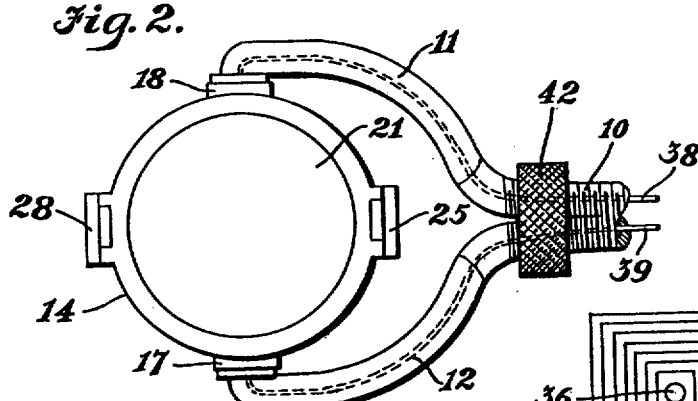
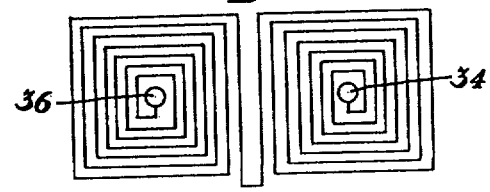
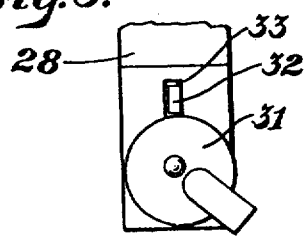
Inventor
Lafayette Holcomb
by Hazard & Miller
Att'ys.

UNITED STATES PATENT OFFICE.

LAFAYETTE HOLCOMB, OF LAS VEGAS, NEVADA.

ELECTRICALLY-HEATED SOLDERING-TOOL.

1,238,671. Specification of Letters Patent. Patented Aug. 28, 1917.

Application filed May 2, 1917. Serial No. 165,963.

*To all whom it may concern:*

Be it known that I, LAFAYETTE HOLCOMB, a citizen of the United States, residing at Las Vegas, in the county of Clark and State of Nevada, have invented new and useful Improvements in Electrically-Heated Soldering-Tools, of which the following is a specification.

My invention relates to electrically heated fountain soldering irons, my principal object being to improve the lay-out and details of construction.

Another object of this invention is to provide a metallic soldering brush by which solder is applied, as desired, and which may be detachably mounted in communication with the soldering receptacle.

It is a further object of this invention to provide a soldering apparatus of the above class which is simple in construction and operation and may be readily manufactured.

Other objects will appear hereinafter.

The invention is illustrated, by way of example, in the accompanying drawings in which:

Figure 1 is a view in side elevation illustrating the end of a soldering iron constructed according to the spirit of the present invention.

Fig. 2 is a view in plan illustrating the device as shown in Fig. 1.

Fig. 3 is a view in enlarged transverse section as seen on the line 3—3 of Fig. 1 particularly showing the manner in which the lid seals the receptacle.

Fig. 4 is a view in transverse section as seen on the line 4—4 of Fig. 1 and discloses in detail the pivotal mounting of the container and the solder brush.

Fig. 5 is a fragmentary view in elevation illustrating the locking member provided for the lid of the receptacle.

Fig. 6 is a view in diagram disclosing the formation and arrangement of the heating elements.

Referring more particularly to the drawings, 10 indicates the handle of a soldering apparatus here shown as forked at its ends to form two prongs 11 and 12, the main handle and prongs being formed of pipe to make them hollow. These prongs are arcuate in their shape and terminate at the opposite sides of a solder receptacle 14, to which they are connected by trunnions 15 and 16.

These trunnions are cylindrical and extend into bosses 17 and 18 formed integral with the body wall 19 of the container. The body wall of the container is cylindrical and formed with a bottom wall 20. The upper end of the container is open and is fitted with a removable cap 21 which has an inwardly extending lip 22 adapted to seal the opening of the container and permit the metal held thereby to be readily heated by means of electric heating elements 23 and 24. The cap is fitted with a hinge-leaf 25 which is pivoted at one end to the cap by a pin 26 and extends down the side of the container where it is pivoted by a pin 27 to the side wall of the container. Due to this construction the cap may be swung entirely away from the top of the receptacle and will permit unrestricted access thereto. A similar leaf 28 is pivoted by a pin 29 to the opposite side of the cap and is formed with a lock member 30 which permits the cap to be locked in position. This member is composed of an eccentric disk 31 which engages a lug 32 extending outwardly from the side of the container and through a slot 33 in the hinge-leaf 28. Rotation of the disk 31 will cause it to wedge against the lug 32 and bind the lid of the container in place.

The electric heating elements used in the present device are formed of wire, as shown in Fig. 6 of the drawings. The wire used in the two heating elements is one continuous length of resistance wire extending from a contact plate 34 in connection with a contact member 35, separated by insulation from the trunnion 15 of the handle, to a contact plate 36 in connection with a member 37, separated by insulation from the end of the trunnion 16. This wire is spirally arranged around each of said contact plates 34 and 36 and permits a compact heating element to be devised which does not have any cross wires that are liable to cause a short circuit. The current is delivered to the contact terminals 34 and 36 by conductors 38 and 39 which extend through the length of the handle 10 and through the prongs 11 and 12. The conductors are detachably secured by some convenient means to a source of electrical power. A layer of insulating material 40 is disposed between the heating elements and the outer face of the receptacle, after which an outer casing 41 of heat insulating material is used to cover the heating elements and permit the heat developed thereby to pass into the receptacle and act upon the metal therein.

As a means for clamping the receptacle in any desired angular relation to the handle 10, a clamping nut 42 is provided and is mounted upon threads extending around the handle at the junction of the fork members 11 and 12. At this point the prongs of the fork extend alongside of each other, but are not connected so that they may be drawn together by the nut in a manner to clamp the shoulders of the trunnions against the bosses 17 and 18 of the receptacle and tighten the electric contacts. The end wall 20 of the receptacle is formed with a downwardly extending boss 43 which is threaded to receive a sleeve 44. This sleeve surrounds a tubular feed duct 45 in communication with the interior of the receptacle. The sleeve 44 is particularly provided to clamp a plurality of fine copper wires in position to form a soldering brush 46, by which the molten metal is spread over the surface to be soldered.

In operation, the receptacle 14 is partially filled with a solder, or other metallic alloy, after which an electric current is passed through the conductors 38 and 39. This current will pass to the contact members 35 and 37 secured to and insulated from the ends of the trunnions 15 and 16. As these plates bear against contact plates 34 and 36, the current will be transmitted to the wire of the heating elements 23 and 24. This will electrically heat the walls of the container and thereafter raise the temperature within it until the metal has reached a molten state, after which the flow may be discontinued, as desired. In case the temperature within the container produces a partial vacuum therein, the top cap may be raised to facilitate in the flow of the molten metal through the duct 47 to the brush 46. This brush will become partially filled with the molten metal and may be placed upon the surface to be soldered without difficulty.

It will thus be seen that the device here disclosed is simple in its construction and operation and provides a convenient means for heating and dispensing solder without the use of other apparatus.

While I have shown the preferred construction of my electrically heated soldering tool as now known to me, it will be understood that various changes in the combination, construction and arrangement of parts may be made by those skilled in the art without departing from the spirit of my invention.

I claim:

1. In an electric fountain soldering iron, a container closed at the bottom and open at the top and having a central discharge opening through the bottom, a cover for the top, hollow bosses extending outwardly from the container, a heating element surrounding the container and having terminals at the bottoms of the hollow bosses, a hollow main handle, hollow prongs extending from the main handle, hollow trunnions upon the ends of the prongs extending into the hollow bosses, insulations against the inner ends of the trunnions, conductor wires extending through the handle, through the prongs, through the trunnions and insulation and connecting with the terminals of the heating element, and means for clamping the prongs to press the trunnions inwardly and tighten the contacts and tighten the prongs against the hollow bosses to hold the container rigidly in a desired position relative to the handle.

2. In an electric fountain soldering iron, a container closed at the bottom and open at the top, a removable cap closely fitting the open end of the container, a hinge leaf pivoted at one end to the cap and extending down the side of the container and pivoted to the container; so that the cap may be swung entirely away from the top of the container; a second leaf pivoted at the opposite side of the cap from the first leaf, an eccentric disk carried by the free end of the second leaf; there being an opening through the leaf outside of the periphery of the eccentric disk; and a lug projecting from the container and adapted to pass through said opening; so that when the eccentric is drawn tight the cap will be tightened upon the container.

3. In an electric fountain soldering iron, a container normally closed at the bottom and having a discharge opening at the center of the bottom, an externally screw-threaded nipple extending downwardly around said opening, a sleeve screw-seated upon said nipple and having a small central passage registering with the discharge opening at the center of the bottom, and a brush formed of bristles of fine copper wire arranged around said opening and extending beyond the end thereof.

4. A point for fountain soldering irons consisting of a socket having a central opening for the flow of solder and a brush of copper bristles arranged around said opening.

In testimony whereof I have signed my name to this specification.

LAFAYETTE HOLCOMB.

Copies of this patent may be obtained for five cents each, by addressing the "Commissioner of Patents, Washington, D. C."